United States Patent Office 2,798,871
Patented July 9, 1957

2,798,871
PROCESS FOR PREPARATION OF α-BROMO-4-NITRO - ACETOPHENONE - HEXAMETHYL-ENETETRAMINE ADDITION COMPOUND

Albert Bloom, Summit, and Eldred V. Welch, North Plainfield, N. J., assignors to General Aniline & Film Corporation, New York, N. Y., a corporation of Delaware No Drawing. Application June 27, 1955,
Serial No. 518,418

1 Claim. (Cl. 260—248.5)

This invention relates to an improved process for the preparation of the addition compound of α-bromo-4-nitroacetophenone and hexamethylenetetramine. This addition compound of α-bromo-4-nitroacetophenone and hexamethylenetetramine is employed as an intermediate in the preparation of Chloramphenicol, a widely used antibiotic.

The usual method employed in the art for making this addition compound involves reacting dry α-bromo-4-nitroacetophenone in a suitable organic solvent, such as chlorobenzene or chloroform, with hexamethylenetetramine in the same solvent, as described, for example, in U. S. Patent 2,546,762. The bromonitroacetophenone employed in this synthesis has ordinarily been obtained, either by the acid hydrolysis of methyl-α-methylene-4-nitrobenzyl ether, by acid hydrolysis in acetic acid, followed by bromination in acetic acid, as described, for example, in U. S. Patent 2,619,505, or by bromination in acetic acid of 4-nitroacetophenone. In either case, it was necessary to isolate the α-bromo-p-nitroacetophenone and dry the same before preparing the addition product with hexamethylenetetramine. The isolation of the α-bromo-4-nitroacetophenone not only introduced an extra step into the process and, thus, added to the cost, but, in addition, the isolated compound, α-bromo-4-nitroacetophenone, is a very strong dermatitic agent, and, thus, constitutes a substantial hazard; this hazard being particularly great when the dry material has to be handled because of the unavoidable dusting involved.

We have now found that it is possible to prepare the addition compound of α-bromo-4-nitroacetophenone and hexamethylenetetramine by starting with either α-methylene-4-nitrobenzyl ether, or 4-nitroacetophenone, and carrying out, in a suitable organic solvent and, without the isolation of any intermediate product the series of reactions described below, leading to the desired addition compound.

In brief, our process involves dissolving α-methylene-4-nitrobenzyl ether in a suitable inert organic solvent, such as aromatic hydrocarbons (e. g., benzene, toluene, xylene), halogenated aromatic hydrocarbons (e. g., mono-, di- and tri-chlorobenzene and mixtures of the same), halogenated aliphatic hydrocarbons (e. g., ethylenedichloride), carbontetrachloride or chloroform, and hydrolyzing the ether to 4-nitroacetophenone by the addition of a small amount of water and acid, preferably mineral acid. On completion of the hydrolysis, the thus obtained solution of 4-nitroacetophenone may be washed with water to remove acid, and dried advantageously by the azeotropic distillation of a small amount of the solvent. The 4-nitroacetophenone, still in solvent, is then brominated by the addition of bromine, and converted to α-bromo-4-nitroacetophenone. On completion of this reaction, the thus obtained solution of α-bromo-4-nitroacetophenone may be washed with water to remove residual hydrogen bromide, and the solution dried again; preferably by azeotropic distillation of a small amount of the solvent. The thus obtained α-bromo-4-nitroacetophenone, still in solution in the solvent, may then be reacted with hexamethylenetetramine by adding thereto a slurry of hexamethylenetetramine in the same solvent to produce the desired addition compound; and the thus addition compound, recovered in a desired manner, as by filtration and drying.

The foregoing series of steps may be formulated as follows:

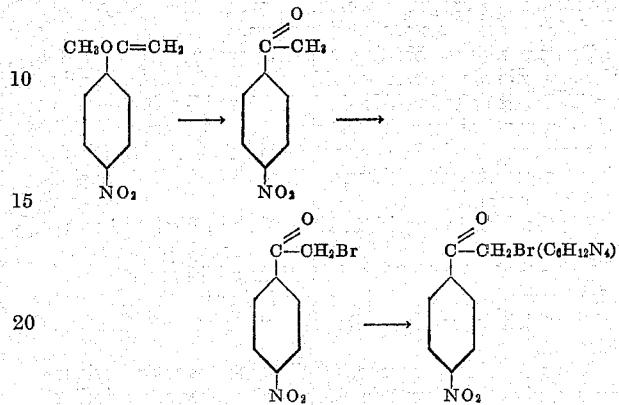

While, in our preferred process, we start with α-methylene-4-nitrobenzyl ether, since this product may readily be prepared as described in U. S. Patent 2,619,505, it is also possible to effect a substantial saving by employing 4-nitroacetophenone, obtained either by the process of the above patent, or by some other process; e. g., by oxidation of 4-nitro-ethylbenzene, the only distinction in this case being that the first step of our process, as formulated above, is omitted.

The details of the present invention will be apparent from the following examples:

Example 1

Charge into a flask 500 cc. chlorobenzene and 89.5 g. dry methyl-α-methylene-p-nitrobenzyl ether (a water paste can also be used). Stir until well dispersed or dissolved. Add 50 cc. water and 4 cc. sulfuric acid 50%. Stir well, heat to 60–65° C. and stir at that temperature for 5 hours. Cool to room temperature, separate the solvent layer and wash with 300 cc. water in 100 cc. portions to remove the sulfuric acid. Distil off a few ccs. of solvent under vacuum to remove the water.

Cool the solution of p-nitroacetophenone in chlorobenzene to 15° C. and add, while agitating, 84 g. bromine at 15–20° C. in 2 hours. Stir at 15–20° C. for 1 hour, warm to 50° C. and hold there for ½ hour. Cool to room temperature and wash the solution with three portions of 150 cc. water to remove the residual hydrogen bromide. Dry the solvent layer by distilling off a few ccs. under vacuum.

Prepare a slurry of 79 g. of finely ground hexamethylenetetramine in 470 cc. dry chlorobenzene and stir to mix well. While agitating this slurry, add rapidly the solution of α-bromo-4-nitroacetophenone in chlorobenzene. The temperature slowly increases to about 50–52° C. Stir at that temperature for 4 hours. Cool to 30° C., filter and suck down well.

Stir the filter cake with 330 cc. ethanol, filter and wash with 80 cc. ethanol. Dry in vacuum over calcium chloride.

There is obtained a high yield of the addition compound of α-bromo-p-nitroacetophenone and hexamethylenetetramine which is nearly white and melts at 118°–120° C. (dec.)

When o-dichlorobenzene, 1,2-dichloroethane and xylene were employed as solvents in the above-described process, in place of chlorobenzene, similar results were obtained, as to yield and clarity of product, except in the case of 1,2-dichloroethane, where the product had a pale yellow color, but corresponded in melting point with the product obtained when the other solvents mentioned were used.

Example 2

82.5 grams of 4-nitroacetophenone were dissolved in 500 cc. of chlorobenzene and cooled to 15° C. There was then added 84 g. bromine at 15–20° C. in 2 hours. Stir at 15–20° C. for 1 hour, warm to 50° C. and hold there for ½ hour. Cool to room temperature and wash the solution with three portions of 150 cc. water to remove the residual hydrogen bromide. Dry the solvent layer by distilling off a few ccs. under vacuum.

Prepare a slurry of 79 g. of finely ground hexamethylene-tetramine in 470 cc. dry chlorobenzene and stir to mix well. While agitating this slurry, add rapidly the solution of α-bromo-4-nitroacetophenone in chlorobenzene. The temperature slowly increases to about 50–52° C. Stir at that temperature for 4 hours. Cool to 30° C., filter and suck down well.

Stir the filter cake with 330 cc. ethanol, filter and wash with 80 cc. ethanol. Dry in vacuum over calcium chloride.

There is obtained a high yield of the addition compound of α-bromo-p-nitroacetophenone and hexamethylenetetramine which is nearly white and melts at 118–120° C. (dec.).

When o-dichlorobenzene, 1,2-dichloroethane and xylene were used as the solvent, in place of chlorobenzene, similar results as to yield and quality of product were obtained, except in the case of 1,2-dichloroethane, where the product had a pale yellow color, but the yield and melting point of the product corresponded to those obtained with the other solvents described.

We claim:

The method for preparing the addition compound of α-bromo-4-nitroacetophenone and hexamethylenetetramine which comprises dissolving methyl-α-methylene-4-nitrobenzyl ether in an inert organic solvent therefore, selected from the group consisting of benzene and methyl and chloro substituted benzenes, adding a small amount of aqueous mineral acid to said solution and warming the same while agitating to thereby hydrolyze said ether to 4-nitroacetophenone, permitting the reaction mixture to stratify and separating the aqueous acid layer from the thus obtained organic solution of 4-nitroacetophenone, dehydrating the thus obtained solution of 4-nitroacetophenone by distilling off a small amount of the solvent, thereafter introducing bromine into said dehydrated solution of 4-nitroacetophenone to thereby produce α-bromo-4-nitroacetophenone, thereafter washing the thus obtained solution of α-bromo-4-nitroacetophenone with water to remove hydrogen bromide therefrom, then distilling off a small amount of the solvent to dehydrate said solution of α-bromo-4-nitroacetophenone and, thereafter, adding to said dehydrated solution a dispersion of hexamethylenetetramine in the same solvent to thereby produce the addition compound of α-bromo-4-nitroacetophenone and hexamethylenetetramine and recovering said addition compound.

References Cited in the file of this patent

UNITED STATES PATENTS

| | | |
|---|---|---|
| 2,515,241 | Long | July 18, 1950 |
| 2,546,762 | Long | Mar. 27, 1951 |

FOREIGN PATENTS

| | | |
|---|---|---|
| 664,587 | Great Britain | Jan. 9, 1952 |
| 1,013,275 | France | 1952 |